(12) United States Patent
Thenard et al.

(10) Patent No.: US 10,585,015 B2
(45) Date of Patent: Mar. 10, 2020

(54) MULTI-ENVELOPE BAG AND SYSTEMS AND METHODS FOR DETECTING A POSSIBLE LOSS OF INTEGRITY OF SUCH A BAG

(71) Applicant: SARTORIUS STEDIM FMT SAS, Aubagne (FR)

(72) Inventors: Laurent Thenard, Plan d'aups Sainte Baume (FR); Marc Hogreve, Adelebsen (DE); Marie-Christine Menier, La Ciotat (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 280 days.

(21) Appl. No.: 15/558,624

(22) PCT Filed: Mar. 17, 2016

(86) PCT No.: PCT/FR2016/050591
§ 371 (c)(1),
(2) Date: Sep. 15, 2017

(87) PCT Pub. No.: WO2016/146950
PCT Pub. Date: Sep. 22, 2016

(65) Prior Publication Data
US 2018/0087997 A1     Mar. 29, 2018

(30) Foreign Application Priority Data
Mar. 19, 2015   (FR) ...................................... 15 52263

(51) Int. Cl.
*G01M 3/32* (2006.01)
*A61J 1/10* (2006.01)
(Continued)

(52) U.S. Cl.
CPC ............. *G01M 3/3218* (2013.01); *A61J 1/10* (2013.01); *A61J 1/1468* (2015.05); *A61J 1/18* (2013.01);
(Continued)

(58) Field of Classification Search
CPC .. G01M 3/3218; G01M 3/3272; G01M 3/227; G01M 3/027; B65D 31/10;
(Continued)

(56) References Cited

U.S. PATENT DOCUMENTS

| 8,910,509 B2 | 12/2014 | Terentiev et al. |
| 2010/0326172 A1 | 12/2010 | Voute et al. |

(Continued)

FOREIGN PATENT DOCUMENTS

| EP | 2 238 425 B1 | 6/2011 |
| EP | 2 662 307 A1 | 11/2013 |

OTHER PUBLICATIONS

International Search Report, dated Jun. 3, 2016, from corresponding PCT/FR2016/050591 application.

*Primary Examiner* — David Z Huang
(74) *Attorney, Agent, or Firm* — Young & Thompson (57) ABSTRACT

Disclosed is a bag including: a first envelope having at least one fill and/or discharge orifice for a biopharmaceutical fluid and a fill and/or discharge tube associated in a fluidtight manner with the fill and/or discharge orifice, a second envelope within which the first envelope is located, and a spacer element. The first envelope, the second envelope, and the spacer element form a coherent whole, in particular during use of the bag, and the fill and/or discharge tube traverses the second envelope by a fluidtight connection, the fill and/or discharge inlet being located outside the second envelope.

26 Claims, 7 Drawing Sheets

(51) Int. Cl.
*G01M 3/22* (2006.01)
*A61J 1/18* (2006.01)
*G01M 3/02* (2006.01)
*A61J 1/14* (2006.01)
*A61J 1/20* (2006.01)
*B65D 30/08* (2006.01)
*B65D 30/20* (2006.01)
*B65D 77/04* (2006.01)

(52) U.S. Cl.
CPC ............ *A61J 1/2003* (2015.05); *B65D 31/04* (2013.01); *B65D 31/10* (2013.01); *G01M 3/027* (2013.01); *G01M 3/227* (2013.01); *G01M 3/3272* (2013.01); *A61J 1/1475* (2013.01); *B65D 77/04* (2013.01)

(58) Field of Classification Search
CPC ....... B65D 31/04; A61J 1/1468; A61J 1/2003; A61J 1/10
See application file for complete search history.

(56) References Cited

U.S. PATENT DOCUMENTS

| | | | |
|---|---|---|---|
| 2012/0128275 A1* | 5/2012 | Voute | B65D 77/04 383/105 |
| 2013/0210153 A1 | 8/2013 | Bottcher et al. | |
| 2014/0083170 A1 | 3/2014 | Pavlik | |
| 2014/0165707 A1 | 6/2014 | Dahlberg et al. | |

* cited by examiner

MULTI-ENVELOPE BAG AND SYSTEMS AND METHODS FOR DETECTING A POSSIBLE LOSS OF INTEGRITY OF SUCH A BAG

FIELD OF THE INVENTION

The invention relates to a flexible multi-envelope bag intended for receiving a biopharmaceutical fluid, and to systems and methods for detecting a possible loss of integrity of such a bag.

The term "biopharmaceutical fluid" is understood to mean a product resulting from biotechnology (culture media, cell cultures, buffer solutions, artificial nutrition liquids, blood products and derivatives of blood products) or a pharmaceutical product or more generally a product intended for use in the medical field. Such a product is in liquid, paste, or possibly powder form. The invention also applies to other products subject to similar requirements concerning their packaging. Such products are of high added value and it is important to ensure their integrity, particularly the absence of any contamination.

BACKGROUND OF THE INVENTION

For storage and transport purposes, it is customary to place such biopharmaceutical fluids in bags having a wall made of plastic that is flexible, closed, and sterile. It is essential that such bags be fluidtight when they receive biopharmaceutical fluid prior to use or during use of the biopharmaceutical fluid, or at least have a satisfactory level of fluidtightness, so that their possible content is preserved from any deterioration originating externally to the bag, such as contamination. It is therefore necessary to be able to easily detect any loss of integrity of the bag before, during, or after use.

Various methods are currently known for verifying the integrity of a bag suitable for containing a biopharmaceutical fluid. A first known method consists of a physical test to determine if the wall of the bag has a leak or hole. Patent EP 2,238,425 describes a method in which the pressure inside an empty and sterile bag is increased between two plates which limit its expansion. A porous material is placed between the wall of the bag and each plate to prevent the contact of the wall and the expansion-limiting plates from concealing any leaks. The bag is inflated and then the variation of the pressure applied to the two plates as a function of the pressure applied inside the bag is analyzed. If there is bag leakage, the pressure applied to the plates of the test device falls over time below a given threshold, which allows concluding a loss of integrity.

Patent US 2014/0165707 discloses another method for testing the integrity of a bag. The bag is placed in a compartment and a structured permeable reception layer is placed between the bag and the compartment. The bag is then connected to a source of filling fluid in order to generate a predetermined positive pressure therein. Then the pressure variation in the bag is analyzed to determine whether it is fluidtight and therefore intact. Similarly, also known are U.S. Pat. No. 8,910,509 or US 2014/0083170 which describe a portable device for verifying the integrity of a bag wherein the bag is filled with air, preferably sterile, before measuring the pressure therein in order to detect any loss of integrity.

Finally, there are also other known methods for verifying integrity using an inert tracer gas. For example, the "Helium Integrity Testing" method (HIT®) involves placing an entire bag in a container and then creating a vacuum in the container once it is closed around the bag. A specific amount of helium is then introduced into the bag. If there is bag leakage, a mass spectrometer detects the presence of helium in the container outside the bag.

These physical test methods, when they are implemented after the bag has been used, may not be able to detect holes in the wall of the bag if they are less than two micrometers, as the holes may be obstructed by residual drops of biopharmaceutical product. In addition, detection of a leak due to a hole smaller than 2 microns is difficult to detect because the leak is often too small to distinguish from the background leakage inherent to the bag. However, it is known that a microorganism can pass through a hole smaller than this size, in particular a hole as small as 0.2 micrometers. The use of the physical test methods described above therefore does not ensure the absence of microbial entry into the bag.

Furthermore, such methods require introducing a gas or fluid into the bag during the integrity verification. These methods therefore cannot be carried out when the bag is filled with biopharmaceutical fluid. These methods therefore must be implemented before (before filling the bag) or after the bag is used (after prior draining of the biopharmaceutical fluid).

When these methods are performed before the bag is used but after its sterilization, the introduction of gas or fluid into the bag during the integrity verification poses a risk to the bag sterility. In particular, the risk of contaminating the bag due to the integrity verification itself is often judged to be greater than the risk of the presence of a hole in the wall of the bag. Because of this risk, these methods are often avoided. When they are implemented, these methods require the use of a sterile port to connect the bag to the pressurization system, which not only poses the risk of loss of sterility, but also is often long and complex to implement.

Moreover, when these methods are implemented after the bag is used, the biopharmaceutical fluid remaining in the bag, for example remaining drops, could clog the holes in the wall of the bag, particularly if these are small in size, and therefore skew the results of the integrity verification. In addition, such physical methods are ineffective for detecting microleaks in the bag, for example holes smaller than two microns. Moreover, it is detrimental to detect possible contamination of the biopharmaceutical fluid of the bag after this fluid is used. In such cases the use of the fluid may have been improper, which is useful to know but can be a problem.

Also known is another type of method for verifying the integrity of a bag suitable for containing biopharmaceutical fluid, before or after its use. This type of method consists of a bacteriological test called a "Bacterial Challenge Test" (BCT) in which the bag is first filled with a culture medium. The bag is closed and then immersed in a bath comprising a bacteriological medium. After removal from the bath, the culture medium of the bag is cultured to detect whether bacteria are present, which implies a leak in the bag wall and the passage of bacteria to inside the bag.

However, the disadvantage of this other type of method is that it takes a long time to implement. In addition, in actual practice, this method is only implemented after use of the bag. Such a method cannot be implemented when the bag is filled with biopharmaceutical fluid, for example during use of the bag, and the risk of impacting the sterility of the bag is too high to implement it before the bag is used. In addition, the conditions for implementing this method are not constant or controlled with certainty. The method is therefore often imprecise and difficult to repeat under identical conditions.

There are also known devices for verifying the integrity of a bag that do not require performing an integrity verification. For example, patent EP 2,662,307 describes a device comprising a first inner envelope defining a first space and forming a bag stricto sensu intended for receiving a biopharmaceutical fluid. A second outer envelope defines a second space in which the first envelope is located. A tracer gas is located either in the first space or the second space, at a pressure different from that of the second space or first space respectively. A colorimetric detection layer is located in the space that is not that of the tracer gas and is responsive to the concentration of tracer gas that reaches it by changing from a first color to a second color. Thus if there is leakage from the first envelope, the colorimetric layer changes color which enables detecting a loss of seal of the bag at any desired moment after manufacture and in any event immediately before use.

However, such a bag does not allow verifying the integrity of the second envelope of the bag, which only serves to contain the tracer gas and not to protect the biopharmaceutical fluid. Also, the presence of the tracer gas and colorimetric detector is ineffective for determining whether the second envelope has remained fluidtight. In addition, prior to its use, the first envelope constituting the bag stricto sensu must be extracted from the second envelope. This device therefore only allows verifying the integrity of the first envelope prior to use of the biopharmaceutical fluid, and not during or after its use.

There is therefore a need, in the specific field of the invention, for effectively protecting a biopharmaceutical fluid in a bag. There is also a need to be able to test the integrity of such bag before, during, or after its use, simply and with the same level of reliability, or even with a higher level of reliability, than the methods currently known or used.

OBJECTS AND SUMMARY OF THE INVENTION

For this purpose, a first aspect of the invention relates to a bag for biopharmaceutical fluid, comprising:
  a first envelope which is flexible, closed, fluidtight, and made of plastic, having a wall defining a first inner chamber intended for receiving the biopharmaceutical fluid, the first envelope being provided with at least one fill and/or discharge orifice for filling and/or discharging biopharmaceutical fluid and at least one fill and/or discharge tube associated in a fluidtight manner with the fill and/or discharge orifice, the fill and/or discharge tube having an inlet for filling and/or discharging the first chamber of biopharmaceutical fluid,
  a second envelope which is flexible, closed, fluidtight, and made of plastic, having a wall defining a second inner chamber in which the first envelope is located, the second inner chamber defining an intermediate space between the wall of the first envelope and the wall of the second envelope, and
  a spacer element interposed between the first envelope and the second envelope, in the intermediate space, suitable for preventing a possible hole in the wall of the first envelope or in the wall of the second envelope from being covered,
characterized in that the first envelope, the second envelope, and the spacer element form a coherent whole, in particular during use of the bag, and in that the fill and/or discharge tube traverses the second envelope by a fluidtight connection, the fill and/or discharge inlet being located outside the second envelope.

A bag is thus obtained which comprises a double envelope, in other words a first envelope and a second envelope which improve the reliability of existing integrity verifications before, during, or after use of the bag, while increasing the intrinsic structural protection of the biopharmaceutical fluid. In particular, the integrity of such a bag can be tested prior to use without contaminating the bag. Such a bag can also be tested when it is already filled with biopharmaceutical fluid or after it has been emptied, without reducing the accuracy of the test performed. Finally, due to its double envelope, such a bag prevents a microorganism from traveling from outside to inside the bag when there are holes smaller than the minimum size detectable by the physical test methods described above.

In various embodiments according to the invention, one or more of the following may possibly be used, separately or in combination:
  the spacer element is porous and completely covers the wall of the first envelope;
  the spacer element is porous and comprises an opening to the wall of the first envelope;
  the first envelope is of the 2D type or the first envelope is of the 3D type comprising two gussets;
  the spacer element comprises at least one porous layer of woven fabric, non-woven fabric, PE, PP, PTFE;
  the spacer element is responsive, in particular sensitive, to the biopharmaceutical fluid that reaches it, a detection member being provided to detect an interaction between the spacer element and the biopharmaceutical fluid;
  the spacer element is neutral, in particular non-toxic, to the biopharmaceutical product;
  the wall of the second envelope comprises a port suitable for being closed or connected in a fluidtight and removable manner to a source of gas or fluid;
  the bag comprises a third envelope which is flexible, closed, fluidtight, and made of plastic, having a wall defining a third inner chamber in which the second envelope is located, the third envelope defining an additional intermediate space between the wall of the second envelope and the wall of the third envelope, the bag further comprising a spacer element interposed between the second envelope and third envelope suitable for preventing a possible hole from being covered in the wall of the second envelope or in the wall of the third envelope;
  the first envelope, the second envelope, the third envelope, and the spacer elements form a coherent whole, in particular during use of the bag;
  the fill and/or discharge tube traverses the third envelope by a fluidtight connection, the fill and/or discharge inlet being located outside the third envelope;
  the intermediate space is filled with a tracer gas at a pressure greater than the pressure present in the additional intermediate space and in the first inner chamber; and
  the tracer gas is selected from the group comprising carbon dioxide, helium, sulfur hexafluoride (SF6), nitrogen, or a mixture thereof.

The invention also relates to a system for verifying the integrity of a bag according to the invention, comprising:
  a bag according to the invention, a source of pressurized gas intended to be introduced into the intermediate space of the bag, a member for measuring the pressure of the gas in the intermediate space in order to compare the pressure drop in the intermediate space once inflated, relative to a predefined pressure drop threshold, and two fixed expansion-limiting plates, spaced apart from and facing one another, suitable for not obstructing any leak in the wall of the second envelope placed against them.

In various embodiments of the invention, one and/or the other of the following may possibly also be employed, separately or in combination:

the expansion-limiting plates are respectively covered with linings that are porous to the gas; and the linings are of the same material as the spacer element.

The invention also relates to a method for verifying the integrity of a bag in order to detect the existence of holes, wherein:

in a preparation phase:
a system is provided for verifying integrity according to the invention,
the bag is placed between the two expansion-limiting plates,
the at least one port of the second envelope is connected to the source of gas and the pressure measurement member, in order to be able to send the pressurized gas into the intermediate space, in a test phase:
the pressurized gas is sent into the intermediate space, the expansion of the bag being restricted when the wall of the second envelope encounters the expansion-limiting plates,
then, in a subsequent step, the pressure drop in the intermediate space is compared to the predetermined threshold by means of the pressure measurement member, such that if the pressure drop in the intermediate space is less than the threshold the second envelope is considered to have passed the integrity verification, whereas if the pressure drop in the intermediate space is greater than the threshold the second envelope is considered not to have passed the integrity verification.

The invention also relates to a system for verifying the integrity of a bag according to the invention, comprising a gas detection member.

In various embodiments of the invention one and/or the other of the following may possibly also be employed, separately or in combination:

the system comprises:
a bag according to the invention,
a source of pressurized gas intended to be introduced into the intermediate space,
a gas pressure control and management member; and
the system further comprises an outer container adapted and intended for receiving the bag in its entirety.

The invention also relates to a method for verifying the integrity of a bag in order to detect the existence of holes, wherein:

in a preparation phase:
a system for verifying integrity according to the invention is provided, in a test phase:
the presence of gas outside the second envelope is detected by means of the gas detection member, such that if the gas is not detected the second envelope is considered to have passed the integrity verification, whereas if the gas is detected the second envelope is considered not to have passed the integrity verification.

In various embodiments of the invention, one or more of the following may possibly be employed, separately or in combination:

in the preparation phase, a system according to the invention is provided and the at least one port of the second envelope is connected to the source of gas and the gas pressure control and management member, in order to be able to send the pressurized gas into the intermediate space during the test phase prior to performing the detection of the presence of gas outside the second envelope;

in the preparation phase, a bag according to the invention is provided and the at least one additional port of the third envelope is connected to the gas detection member; and in the preparation phase, a system according to the invention is provided and the gas detection member is connected to a port of the outer container, so as to enable detection of the gas inside the outer container during the test phase.

The invention also relates to a method for verifying the integrity of a bag in order to detect a possible hole, wherein:

a bag according to the invention is provided wherein the first inner chamber is filled with a culture medium suitable for allowing the growth of bacteria,
the bag is closed,
a bacteriological medium is applied to the exterior of the bag,
the culture medium filling the first chamber is cultured and detection of the presence of bacteria in the culture medium is performed, such that if bacteria are not detected the first envelope and/or the second envelope are considered to have passed the integrity verification, whereas if bacteria are detected the first envelope and the second envelope are considered not to have passed the integrity verification.

According to one embodiment, the bacteriological medium is applied to the bag by spraying the bacteriological medium on the bag or by immersing the bag in the bacteriological medium.

BRIEF DESCRIPTION OF THE DRAWINGS

The figures of the drawings are now briefly described.

3C), and is associated with the wall of the first envelope towards its outer face (FIG. 3B).

MORE DETAILED DESCRIPTION

A detailed description of several embodiments of the invention is provided below, accompanied with examples and with reference to the drawings.

The object of the invention is a bag 1 for receiving and protecting a biopharmaceutical fluid 2, as well as systems for verifying the integrity of the bag 1 in order to detect the existence of leaks or holes, and associated methods.

The bag 1 comprises at least a first envelope 3 and a second envelope 4.

The first envelope 3 is formed from a wall 5 made of plastic. The first envelope 3 is flexible and fluidtight, as is its wall 5. "Fluidtight" here is understood to mean that the wall 5 of the first envelope 3 does not allow the passage of biopharmaceutical fluid 2, of gas, in particular inflation gas as will be subsequently described, or of possible contaminants. The first envelope 3 and the wall 5 form and define a closed first inner chamber 6, which can be flat or expanded to volume and which is adapted and intended for receiving biopharmaceutical fluid 2. The first envelope 3 is thus typically either in a flat folded state, for example for storage, transportation, and handling, or in a deployed unfolded state for receiving and protecting the biopharmaceutical fluid 2, or in an intermediate state. The first envelope 3 can be deformed to change from one to another of these states.

Figure 1:
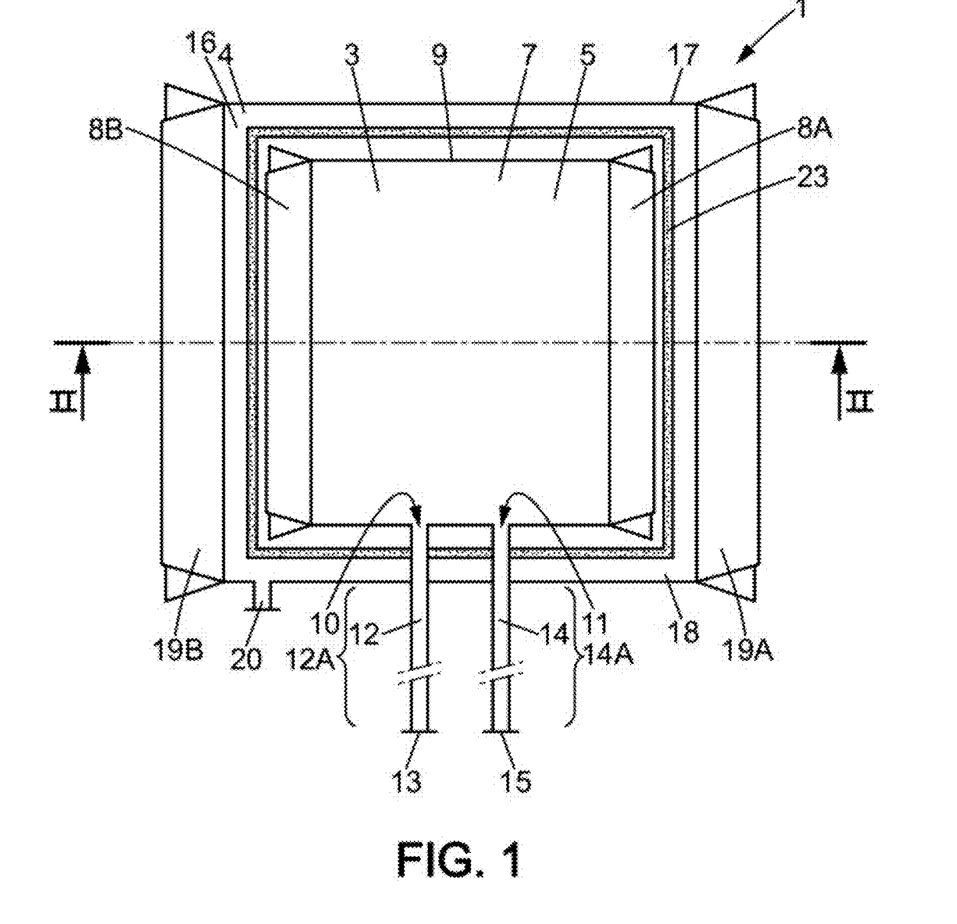
FIG. 1 is an elevational view of a bag for receiving and protecting a biopharmaceutical fluid according to the invention, showing the first envelope, the spacer element, the second envelope, the fill tube and the discharge tube. The first envelope, the spacer element. and the second envelope form a coherent whole during use of the bag.
Figure 2A:
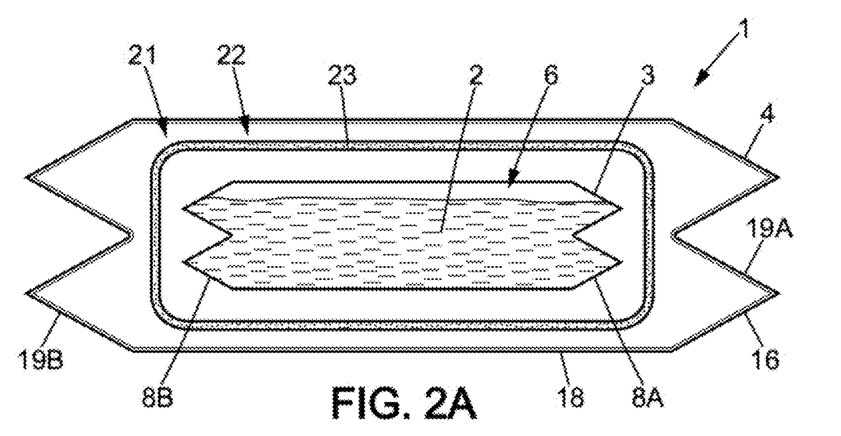
FIG. 2A is a sectional view along plane II-II of the bag represented in FIG. 1, in which the spacer element completely covers the first envelope.
Figure 2B:
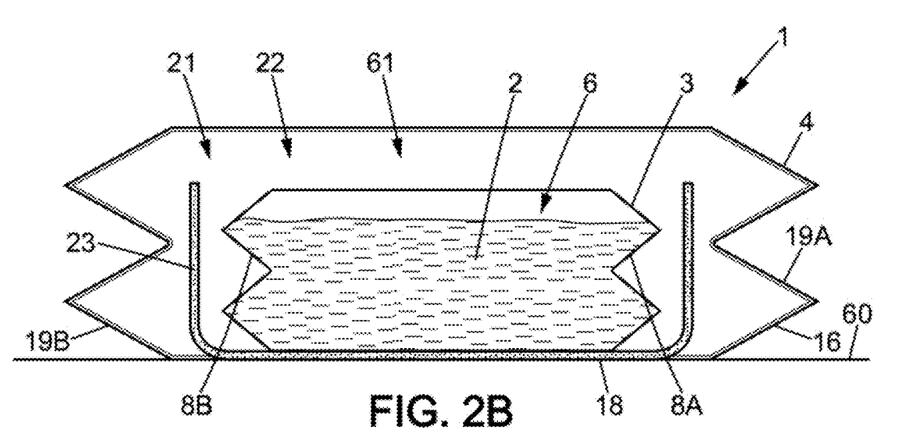
FIG. 2B is a sectional view along plane II-II of the bag represented in FIG. 1, in which the bag is placed on a support and in which the spacer element partially covers the first envelope.

The first envelope 3 may be 2D, in which two walls are directly joined to one another. The first envelope 3 may also be 3D, in other words three-dimensional, as shown in FIGS. 1, 2A, and 2B. The first envelope 3 then typically has a main wall 7 in two parts which are fixedly and sealingly connected to two side gussets 8A, 8B by fluidtight welds 9.

Figure 3A:
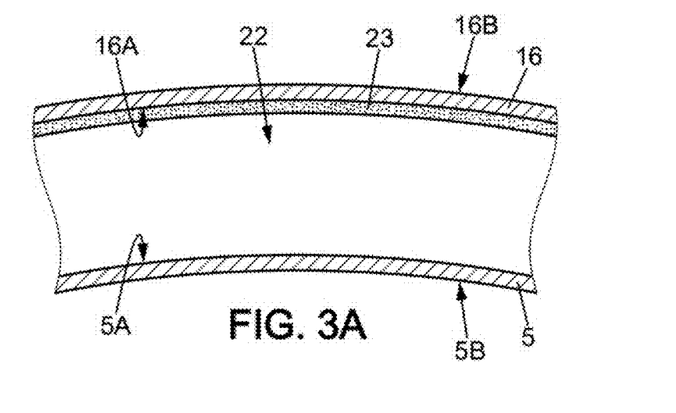
FIGS. 3A, 3B, and 3C are three enlarged partial cross-sectional views illustrating three possible embodiments of the bag, in which the spacer element is positioned towards the inner face of the wall of the second envelope of which it is an integral part (FIG. 3A), is positioned between the walls of the first envelope and the second envelope (FIG.
Figure 3B:
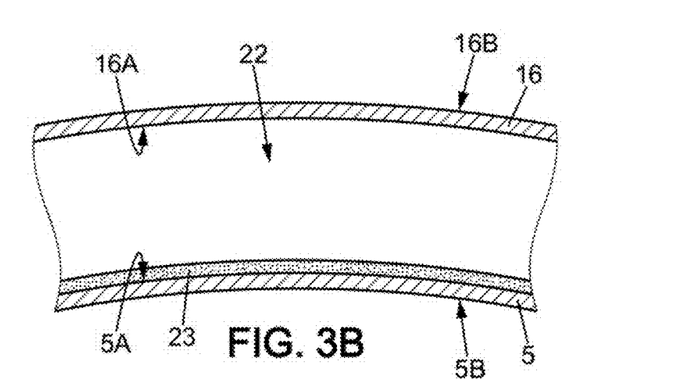
Figure 3C:
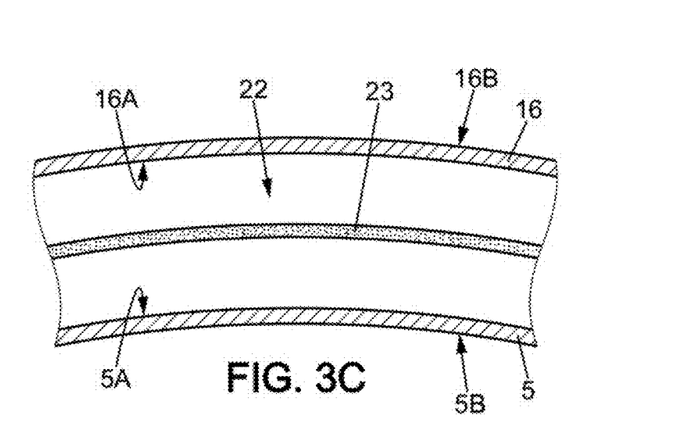

The first envelope 3, specifically its wall 5, has an outer face 5A and an inner face 5B shown in FIGS. 3A-3C. The terms "outer" and "inner" are understood here relative to what is respectively located outside and inside the first envelope 3. The first envelope 3 itself defines the first inner chamber 6 inside itself, bounded by the inner face 5B and of a volume appropriate for receiving the biopharmaceutical fluid 2 in the first envelope 3 when so desired.

The wall 5 of the first envelope 3 is provided with an orifice 10, in other words a passage, for filling with the biopharmaceutical fluid 2, and an orifice 11, in other words a passage, for discharging the biopharmaceutical fluid 2. With the fill orifice 10 and discharge orifice 11 of the first envelope 3 and the wall 5, are respectively associated by fluidtight connections a fill tube 12 having at the opposite end an inlet 13 for filling the first inner chamber 6 with the biopharmaceutical fluid 2 and a discharge tube 14 having at the opposite end an outlet 15 for draining the first inner chamber 6 of biopharmaceutical fluid 2. The fill inlet 13 and the discharge outlet 15 can respectively be selectively placed in the closed or open state, for example by opening/closing devices (not shown).

Alternatively, the first envelope 3 may comprise a single fill and discharge orifice. In this embodiment, a single tube serving as a tube for filling and discharging biopharmaceutical fluid 2 in the first inner chamber 6 is then associated by a fluidtight connection with the orifice of the first envelope 3. According to yet another alternative, the first envelope 3 may comprise more than two fill and discharge orifices, and therefore more than two fill and/or discharge tubes.

"Fluidtight connection" is understood to mean a structure such that the wall 5 of the first envelope 3 and the tube 12, 14 in fluid communication with the orifice 10, 11 are associated with each other so as not to permit any passage between them, particularly of the biopharmaceutical fluid 2 or a gas or possible contaminants, and to form a single inseparable whole.

"Tube" is understood to mean a hollow structure that is more or less long or short, the term also including a simple port.

The second envelope 4 is outside the first envelope 3, the first envelope 3 being internal and intended to be placed within the second envelope 4. Thus, the first envelope 3 (and therefore the first inner chamber 6) is placed completely within, in other words inside of, the second envelope 4, or symmetrically the second envelope 4 is placed so as to surround the exterior of the first envelope 3 (and therefore the first inner chamber 6).

As a result, the second envelope 4 is larger than the first envelope 3, or symmetrically the first envelope 3 is smaller than the second envelope 4. This is true whether the first envelope 3 is empty of biopharmaceutical fluid 2 or filled with biopharmaceutical fluid 2.

The second envelope 4 comprises a wall 16 most often having several parts welded together along fluidtight welds 17. The second envelope 4 is closed and fluidtight. The second envelope 4 thus structurally increases the protection of the biopharmaceutical fluid 2 from any outside contamination while increasing the reliability of the bag 1.

In particular, the wall 16 is made of plastic, non-porous, so that the second envelope 4 is a fluidtight whole (the term "fluidtight" here for the second envelope 4 is to be understood in the same manner as for the first envelope 3). In particular, it is flexible, so that it can be flat for storage, transport, and handling. The second envelope 4 may in particular be 2D, in which two walls are directly joined to one another. The second envelope 4 may also be 3D, in other words three-dimensional, as shown in FIGS. 1, 2A, and 2B. The second envelope 4 then typically has a main wall 18 in two parts which are fixedly and sealingly connected to two side gussets 19A, 19B by fluidtight welds 17.

The wall 16 of the second envelope 4 preferably has a limited capacity for expansion. In particular, in the case where the wall 16 comprises plastic material, the wall 16 may also comprise a non-expandable film, for example aluminum, in order to limit the expansion of the wall 16 of the second envelope 4 during pressurization of the second inner chamber 21 as it will be described below.

The fill tube 12 and the discharge tube 14 traverse the wall 16 of the second envelope 4, extending to either side thereof. The passages through the second envelope 4 by the fill tube 12 and discharge tube 13 are implemented by fluidtight connections (this term is to be understood as explained above). Fluidtight connections such as those previously mentioned may be created by welding or the like. With this arrangement, a section 12A of fill tube 12 and a section 14A of discharge tube 14 are respectively located outside the second envelope 4. The fill inlet 13 and the discharge outlet 15 which are associated with the first envelope 3 are therefore also located outside the second envelope 4, so as to be accessible.

The second envelope 4, namely its wall 16, has an inner face 16A and an outer face 16B illustrated in FIGS. 3A-3C. The terms "inner" and "outer" are understood here as respectively being in relation to what is located inside and outside the second envelope 4. The second envelope 4 defines a second inner chamber 21 inside itself, bounded by the inner face 16A and of a volume appropriate for receiving the first envelope 3, empty or filled with biopharmaceutical fluid 2.

The first envelope 3 is therefore introduced beforehand into the second envelope 4. The second envelope 4 is then placed in the closed state, in particular by fluidtight welds 17, once the first envelope 3 has been introduced into the second inner chamber 21. In particular, the second envelope 4, once closed, is no longer to be reopened in order to extract the first envelope 3 before use of the biopharmaceutical fluid 2. In particular, the bag 1 may first be created in a clean room by assembling the first envelope 3 with the second envelope 4. The bag 1 may then be sterilized with ionizing radiation.

Outside the first envelope 3 but inside the second envelope 4, an intermediate space 22 is formed within the second inner chamber 21 outside the first envelope 3. The limits of the intermediate space 22 are the outer face 5A of the wall 5 of the first envelope 3 and the inner face 16A of the wall 16 of the second envelope 4. On wall 16, in particular on the main wall 18, at least one port 20 suitable for alternately being closed or connected in a fluidtight and detachable manner, for example to a source of gas, may be provided. In particular, the port 20 may be placed in the open state to allow the introduction of a gas into the second envelope 4, and in particular into the intermediate space 22. The port 20 may also be placed in the closed state, in particular during storage, transport, and use of the bag 1.

The bag 1 also comprises a spacer element 23 housed in the intermediate space 22, interposed between the wall 5 of the first envelope 3 and the wall 16 of the second envelope 4. This spacer element 23 is adapted to prevent a possible hole T in the wall 5 of the first envelope 3 or in the wall 16 of the second envelope 4 from being covered. Such could in fact be the case if the walls 5, 16 come into contact with each other.

The spacer element 23 is porous and may comprise one or more porous layers fully covering the outer face 5A of the wall 5 of the first envelope 3 and/or the inner face 16A of the wall 16 of the second envelope 4. In particular, the spacer element 23 extends over the entire surface of the outer face 5A of the wall 5 of the first envelope 3 and/or the inner face 16A of the wall 16 of the second envelope 4.

Alternatively, as illustrated in FIG. 2B, the spacer element 23 may also comprise an opening 61 to the wall 5 of the first envelope 3, so that it does not extend across the entire surface of the outer face 5A of the wall 5 of the first envelope 3 and/or the inner face 16A of the wall 16 of the second envelope 4. The opening 61 is macroscopic in size and may consist of a hole in the spacer element 23 of variable size. The spacer element 23 may in particular not cover one of the faces of the wall 5 of the first envelope 3. In this alternative, when the bag 1 is placed on a support 60 as illustrated in FIG. 2B, only the face of the wall 5 of the bag 1 on the side of the support 60 is then covered with the spacer element 23.

The spacer element 23 may be directly in contact with the outer face 5A of the wall 5 of the first envelope 3 and/or the inner face 16A of the wall 16 of the second envelope 4.

The spacer element 23 is porous as a result either of an arrangement resulting in porosity, or the use of one or more porous materials. For example, the intermediate element 23 may comprise one or more porous layers of woven fabric, non-woven fabric, PE, PP, PTFE, or other similar material.

Here, the term "porosity" is understood to mean that the spacer element 23 comprises a multiplicity of interstices adjacent to one another, traversing from one side to the other the layers constituting the spacer element 23, such that any hole T on the outer face 5A of the wall 5 of the first envelope 3 is necessarily facing and in communication with at least one interstice of the spacer element 23, and such that a gas or fluid can traverse the spacer element 23 from side to side.

The arrangement of the spacer element 23 relative to the first envelope 3 and second envelope 4 may have different implementations. Where appropriate, these implementations may be combined. In a first embodiment (FIG. 3A), the spacer member 23 structurally covers the inner face 16A of the wall 16 of the second envelope 4. In a second embodiment (FIG. 3C), the spacer element 23 is placed unattached in the intermediate space 22. In a third embodiment (FIG. 3B), the spacer element structurally covers the outer face 5A of the wall 5 of the first envelope 3. In all these embodiments, the spacer element 23 may be deformable, in particular in order to fit to the shape of the outer face 5A of the wall 5 whether the first envelope 3 is empty of biopharmaceutical fluid 2, in particular in the folded state, or is filled with biopharmaceutical fluid 2, in particular in the unfolded state.

Here, the term "structurally cover" is understood to mean that the spacer element 23 extends in contact with one face, including the spacer element 23 being a structural part of a wall in an inseparable or almost inseparable manner or similarly. In the embodiments where the spacer member structurally covers the inner face 16A of the wall 16 of the second envelope 4 or the outer face 5A of the wall 5 of the first envelope 3 (FIGS. 3A and 3C), the spacer element 23 can be fixed to these faces 16A, 5A for example by welding, bonding, or by any other means.

In the case where the first envelope 3 is a 3D bag, the spacer element 23 may completely, and possibly also structurally, cover the outer face of the inside of each of the gussets 8A, 8B of the first envelope 3. "The inside of each gusset" is understood to mean the portion of the gusset adjacent to the inward fold. Without the spacer element 23 it would be possible for the two outer faces of the two parts of the gusset that are adjacent to the inward fold to come in contact with one another so that any hole T in one of the outer faces would be covered over by the other outer face.

Due to the presence of the spacer element 23 in each gusset 8A, 8B, any such covering can be prevented.

Furthermore, as illustrated by FIG. 1, the fill tube 12 and the discharge tube 14 traverse the spacer element 23 and extend to either side thereof, in particular into the intermediate space 22 and outside the second envelope 4.

The spacer element 23 is preferably neutral, in particular non-toxic, to the biopharmaceutical fluid 2, in particular contained within the first inner chamber 6 of the first envelope 3. "Neutral" is understood to mean that if the spacer element 23 comes in contact with the biopharmaceutical fluid 2, the spacer element 23 causes no physical or chemical reaction resulting in degradation, contamination, or alteration of the biopharmaceutical fluid 2. Also, even after contact with the spacer element 23, the biopharmaceutical product 2 remains suitable for its end use, medical or otherwise.

The spacer element 23 may further be responsive, in other words sensitive, to the presence of the biopharmaceutical fluid 2 that reaches it, a detection member being suitable for detecting an interaction between the spacer element and the biopharmaceutical fluid. For example, the spacer element 23 can change from a first color to a second color different from the first color. The spacer element 23 can thus be locally colored a second color specifically at the location where the biopharmaceutical fluid 2 came into contact with the spacer element 23. For example, the spacer element 23 may be porous pH paper which reacts by changing color upon contact with the biopharmaceutical fluid 2. This makes it possible to determine the location of a potential hole by examining the spacer element 23. In particular, in case of contact with the biopharmaceutical fluid 2, the fluid will flow from the inner face to the outer face of the spacer element 23 due to the porosity of the spacer element 23, at which point the color change can be detected by optical (or visual) means, for example through the second envelope 4 if the latter is transparent or translucent.

The spacer element 23 may be transparent, for example in order to view the biopharmaceutical fluid 2 contained in the first inner chamber 6 of the bag 1. Alternatively, the spacer element 23 may be opaque. In this alternative, the opening 61 as represented in FIG. 2B then enables viewing the biopharmaceutical fluid 2 contained in the first inner chamber 6.

In order to receive and effectively protect the biopharmaceutical fluid 2, the first inner chamber 6 of the first envelope 3 and its possible content must be shielded from any possible deterioration originating externally to the bag 1, such as contamination. The first envelope 3 and/or the second envelope 4 are therefore designed and manufactured to be fluidtight, but manufacturing defects cannot be excluded and fluidtightness may be affected after manufacture.

Fluidtightness may be impacted where the first envelope 3 and the second envelope 4 each comprise one or more through-passages or holes T, including a porosity, this or these passages having one or more outlets respectively in the outer face 5A of the wall 5 of the first envelope 3 and the outer face 16B of the wall 16 of the second envelope 4, including the welds 9, 17 between the component parts of the first and second envelopes 3, 4 in question. In particular, such holes T resulting in a loss of fluidtightness of the first envelope 3 and/or the second envelope 4 may be small in size, like pinholes, or microscopic. For example, the holes T may be smaller than 10 micrometers, or even smaller than 2 micrometers.

Before, during, or after the use of a bag 1 according to the invention, it is therefore essential to ensure that the first envelope 3 and/or the second envelope 4 have the required fluidtightness and therefore have no holes T that could lead to contamination of the biopharmaceutical fluid 2. As it is then considered to be "intact", the bag 1 is able to receive and protect a biopharmaceutical fluid 2, while a bag 1 in which the first and second envelopes 3, 4 do not have this fluidtightness is considered not to be intact and, as it is unfit to receive and protect a biopharmaceutical fluid 2, in the context of the process of making use of the bags 1 it must be rejected and not used. In particular, if only the fluidtightness of the first envelope 3 is affected, its content if any, and in particular the biopharmaceutical fluid 2, is preserved because it remains confined by the second inner chamber 21. If only the fluidtightness of the second envelope 4 is affected, the content if any of the first envelope 3, and in particular the biopharmaceutical product 2, is preserved because it remains confined in the first inner chamber 6. However, if the fluidtightness of the first envelope 3 and second envelope 4 are both affected, then the bag 1 is no longer intact.

Also, with the structure just described, the first envelope 3, the second envelope 4, and the spacer element 23 form a coherent whole, in particular for one-time use, ensuring the integrity of the biopharmaceutical product 2. In particular, is not necessary with a bag 1 according to the invention to extract the first envelope 3 from the second envelope 4 before using the biopharmaceutical fluid, because the fill inlet 13 and the discharge outlet 15 that are associated with the first envelope 3 are located outside the second envelope 4.

The bag 1 according to the invention comprising a first envelope 3 and a second envelope 4 thus makes it possible to enhance the reliability of the bag 1 throughout its use, in particular before or during use of the biopharmaceutical fluid 2. This is even more true because, even if each of the first and second envelopes 3, 4 have a hole T, it is statistically unlikely that these holes T are near one another and aligned in a manner that allows a contaminant to travel easily from outside to inside the first envelope 3 where the biopharmaceutical fluid 2 is located. For example, it is estimated that if the first envelope 3 and the second envelope 4 each have a hole T, particularly a hole less than 2 micrometers and therefore undetectable with a physical integrity test method, the probability that the two holes are closer together than 10 millimeters in a bag 1 having a capacity equal to 5 liters is about $10^{-7}$. It is thus statistically unlikely that a contaminant can propagate from the exterior into the first chamber 6. If a microorganism passes through a hole T of the second envelope 4, it cannot grow in the intermediate space 22 where there is no nutrient since this space is a sterile medium, in order to spread into the first envelope 3.

Moreover, with a bag 1 according to the invention, one can use integrity verification methods quickly and simply, including physical ones. The following describes embodiments of the invention in which detection of a possible loss of fluidtightness of the second envelope 4 of a bag 1 as described above is performed.

Figure 4:
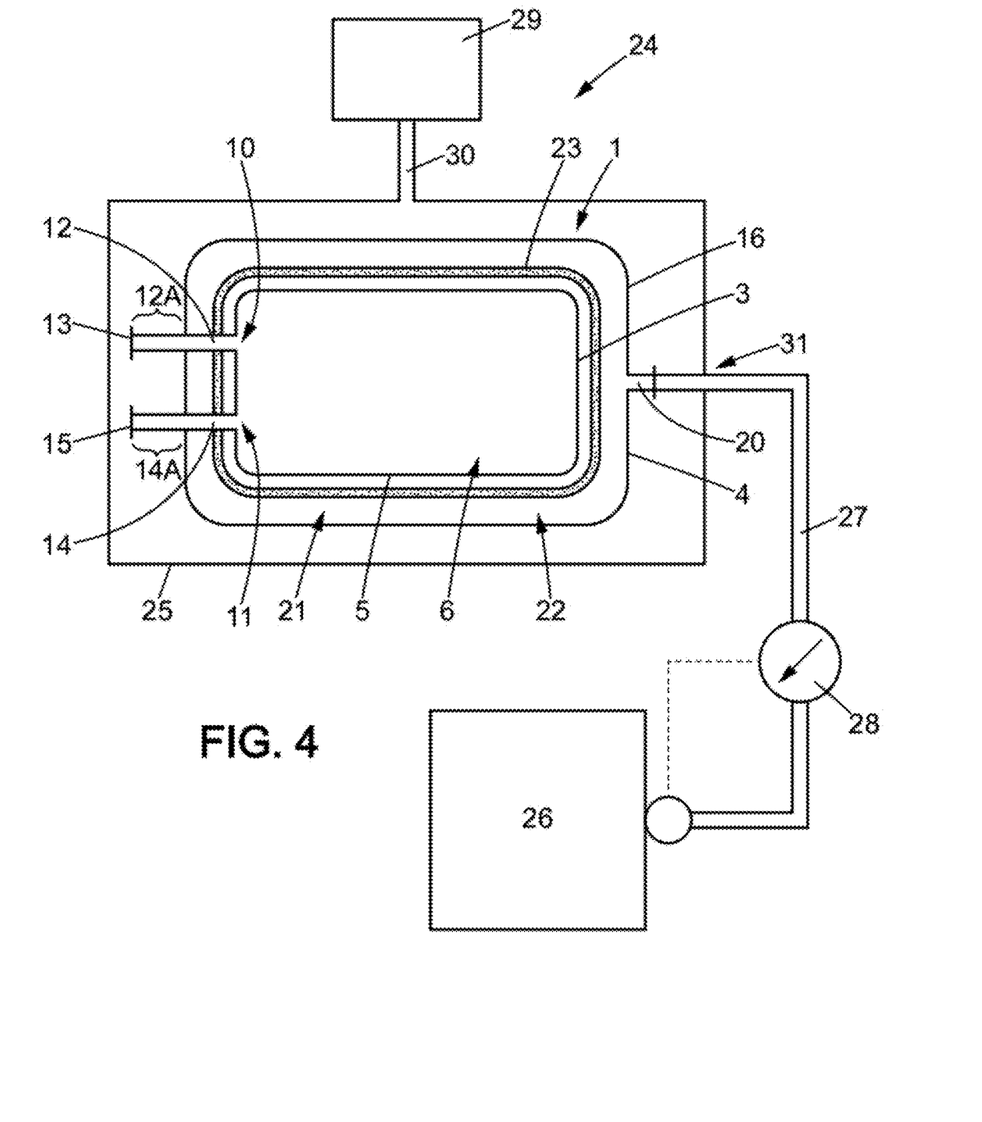
FIG. 4 is a schematic view of a first embodiment of a system for verifying the integrity of a bag, the bag being arranged in an outer container, the system comprising a source of pressurized gas intended to be introduced into the intermediate space of the bag, a member for managing and controlling the gas in the intermediate space of the bag, and a member for detecting gas in the container.

In a first embodiment which can be illustrated by FIG. 4, a system 24 is used to detect the integrity of the bag 1, and in particular the second envelope 4.

This system 24 comprises an outer container 25 in which the bag 1 according to the invention can be placed. The outer container 25 is adapted and intended for receiving the entire bag 1. As a result, the outer container 25 is larger than the bag 1 or symmetrically the bag 1 is smaller than the outer container 25. In particular, the system 24 may comprise a lining porous to the gas inside the outer container 25. The lining, against which the bag 1 is placed, does not block any leakage of the second envelope 4 when the bag 1 is placed in the outer container 25.

The outer container 25 may in particular consist of a box or a rigid or semi-rigid fluidtight shell. More particularly, in one configuration, the outer container 25 has a parallelepipedic shape. The outer container 25 may comprise an opening for introducing the bag 1, which can be selectively open or closed. To this end, the outer container 25 may comprise for example a removable cover provided with members for gripping and handling. Where appropriate, members are provided for quickly locking the cover in the closed position, capping the opening.

The system 24 comprises a source 26 of pressurized gas and a line 27 for the injection of pressurized gas, able to be associated in fluid communication or being associated in fluid communication with the outlet of the port 20 of the second envelope 4 of the bag 1. The gas is intended to be inserted into the intermediate space 22 of the bag 1, in particular into the second envelope 4 via the port 20 and appropriate connecting elements. Such a gas may for example be an inert gas, and in particular a gas neutral (this term to be understood as defined above) to the biopharmaceutical fluid 2, in order not to contaminate the biopharmaceutical fluid 2 in the event of the first envelope 3 being pierced.

The system 24 also comprises a control and management member 28. The control and management member 28 may for example be a pressure controller for the pressurized inflation gas in the injection line 27, ordering the injection of gas when desired and controlling the injection at the desired pressure. Such a member 28 may be a pressure gauge, an adjustable valve, and/or a control line between them.

The system 24 also comprises a member 29 for detecting gas in the outer container 25. This gas detection member 29 in particular is able to be associated in fluid communication or is associated in fluid communication with a port 30 of the outer container 25. Such a member 29 may be for example a mass spectrometer, in particular if a vacuum is created in the outer container 25 prior to the phase of testing the bag 1 with the system 24.

The method for making use of the system 24 for verifying the integrity of the bag 1 which has just been described, comprises a preparation phase followed by a test phase.

In the preparation phase, a bag 1 as described and a system 24 as described are provided. The bag 1 is placed in the outer container 25. The bag 1 and in particular the first envelope 3 may be filled with biopharmaceutical fluid 2 or empty of biopharmaceutical fluid 2. The fill inlet 13 and the discharge outlet 15 of the first envelope 3 are then in the closed state.

The port 20 of the second envelope 4 is connected to the source 26 of gas, which is made possible because of a sealed opening 31 through which the injection line 27 passes into the outer container 25. Next, the outer container 25 is closed and possibly a vacuum is created inside it. By means of this connection, it is then possible to send the pressurized gas into the intermediate space 22 of the bag 1.

In the test phase, the pressurized gas is fed from the source 26 into the intermediate space 22 of the bag 1. It is necessary in general to avoid excessive gas pressure in order to prevent draining the first inner chamber 6, if it is filled with biopharmaceutical fluid 2, or placing too much stress on the first envelope 3 and/or second envelope 4. Next, in a subsequent step, detection of the presence of gas in the outer container 25, and in particular outside of the bag 1, is performed by means of the gas detection member 29.

One can then interpret the results of the integrity verification. If the gas is not detected, the second envelope 4 is considered to have passed the integrity verification. However, if the gas is detected, the second envelope 4 is considered not to have passed the integrity verification.

By using a bag 1 comprising a first and a second envelope 4, it is not necessary that a gas introduction port be formed directly in the wall 5 of the first envelope 3 containing the biopharmaceutical fluid 2. Thus, in case of a loss of sterility at the port 20 during use of the integrity verification system 24 as described, the biopharmaceutical fluid 2 remains protected by the first envelope 3.

Figure 5:
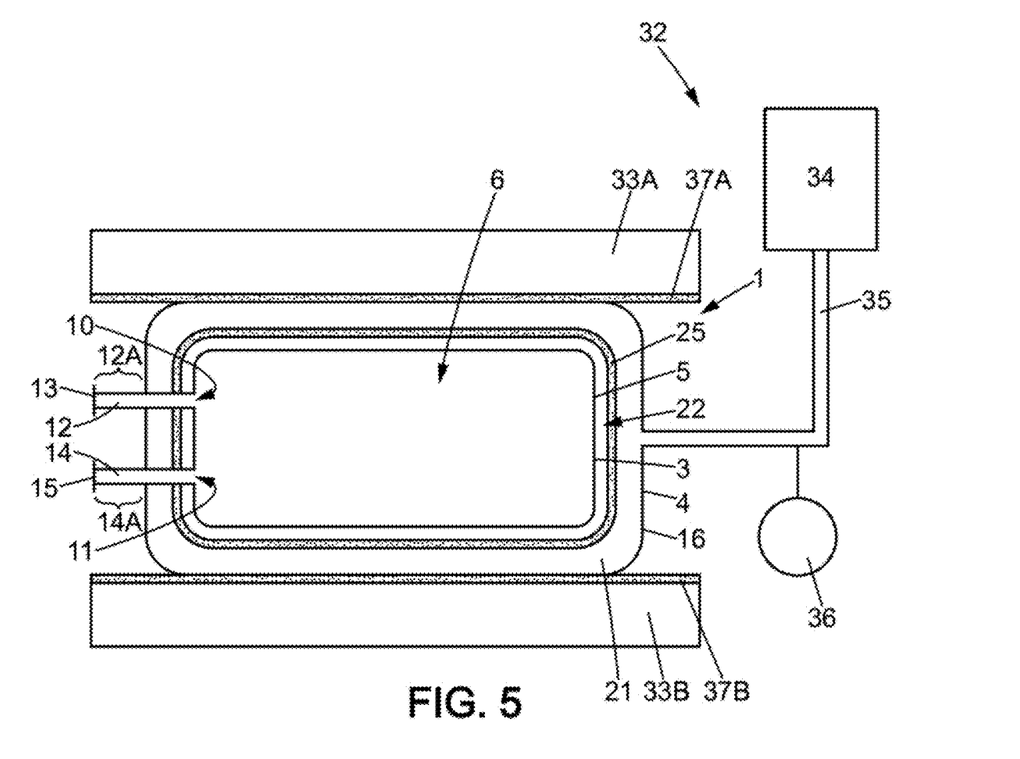
FIG. 5 is a schematic view of a second embodiment of a system for verifying the integrity of a bag, with two fixed expansion-limiting plates, in which the bag to be verified has been placed.

In a second embodiment illustrated by FIG. 5, another system 32 for detecting the integrity of the bag 1, and in particular the second envelope 4, is described. The system 32 may in particular correspond to the one described in patent EP 2 238 425. The system 32 comprises a source 34 of pressurized gas and an injection line 35 for the injection of pressurized gas, able to be associated in fluid communication or being associated in fluid communication with the port 20 of the second envelope 4 of the bag 1. The gas is intended to be introduced into the intermediate space 22 of the bag 1, in particular into the second envelope 4 via the port 20 and appropriate connecting elements.

The system 32 also comprises a member 36 for measuring the pressure of the gas in the second envelope 4 via the port 20 and the connecting elements. This measurement member 36 permits the comparison of the pressure drop in the intermediate space 22 of the second envelope 4 once inflated, relative to a predefined threshold, as will be explained below. Such a member 36 may be a pressure gauge for example.

The system 32 also comprises two rigid and fixed expansion-limiting plates 33A, 33B. These plates 33A, 33B are spaced apart from and facing one another, in this case arranged substantially parallel to one another. The expansion-limiting plates 33A, 33B have the essential characteristic of not obstructing a possible leak or hole T in the wall of the bag 1 placed against them, particularly in the wall 16 of the second envelope 4.

The expansion-limiting plates 33A, 33B may be intended for contact, wholly or only partially, with the wall 16 of the second envelope 4 of the bag 1, and arranged to allow the passage of pressurized gas that could travel from the intermediate space 22 due to the existence of a leak, meaning one or more holes T in the wall 16 of the second envelope 4.

For this purpose, the expansion-limiting plates 33A, 33B are respectively covered with linings 37A, 37B which are porous to the gas. In particular, such linings 37A, 37B may be made of the same material as the spacer element 23. It is understood that the expansion-limiting plates 33A, 33B must have a rigidity able to withstand the pressure exerted by the bag 1 once it is inflated.

The method for making use of the device for verifying the integrity of the bag 1 which has just been described comprises a preparation phase followed by a test phase.

In the preparation phase, a bag 1 as described and a system 32 as described are provided. The bag 1 is placed flat between the two expansion-limiting plates 33A, 33B. The bag 1, and in particular the first envelope 3, may in particular be filled with biopharmaceutical fluid 2 or empty of biopharmaceutical fluid 2. The fill inlet 13 and the discharge outlet 15 of the first envelope 3 are then in the closed state.

The port 20 of the second envelope 4 is connected to the source 34 of gas and the pressure measurement member 36, which is made possible via the injection line 35. With this connection, it will then be possible to send the pressurized gas into the intermediate space 22 and to measure the gas pressure.

In the test phase, the pressurized gas is fed from the source 34 into the intermediate space 22 of the second envelope 4. The expansion of the second envelope 4 is restricted, as its wall 16 encounters the expansion-limiting plates 33A, 33B, specifically the linings 37A, 37B.

It is usually necessary to wait for a stabilization period to end before proceeding with the test itself. Then, in a subsequent step, the pressure drop in the intermediate space 22 is compared, by means of the pressure measurement member 36, to a predefined pressure drop threshold. This threshold is for example the value of the pressure drop of a bag 1 undergoing integrity verification and considered to be intact. The results of the integrity verification can then be interpreted. If the pressure drop in the bag 1 is less than the threshold, the second envelope 4 is considered to have passed the integrity verification. However, if the pressure drop in the second envelope 4 is greater than the threshold, the second envelope 4 is considered not to have passed the integrity verification.

Figure 6:
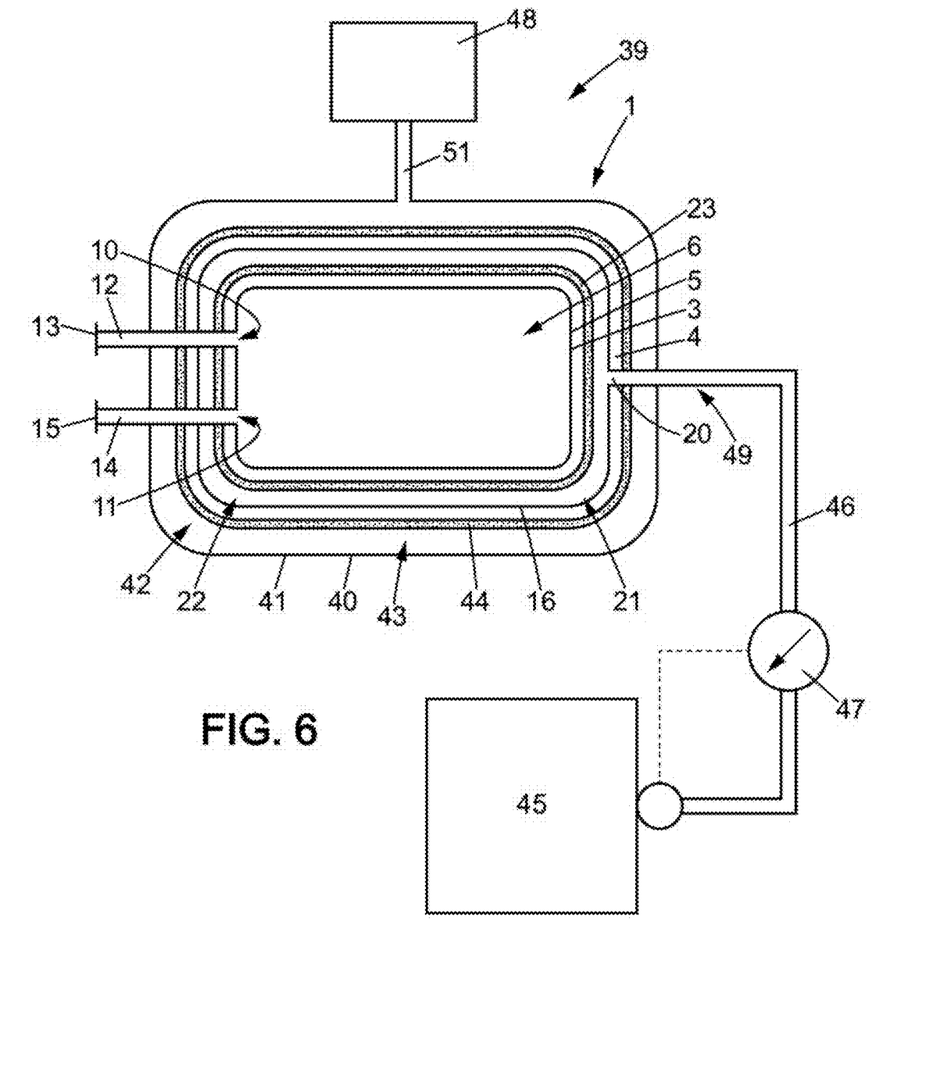
FIG. 6 is a schematic view of a third embodiment of a system for verifying the integrity of a bag comprising a third envelope, said system comprising a source of pressurized gas intended to be introduced into the second envelope, a member for measuring the gas pressure in the intermediate space of the bag, and a gas detection member connected to the third envelope.

In a third embodiment, illustrated by FIG. 6, another system 39 for detecting the integrity of a bag 1 which also comprises a third envelope 40 is described.

The third envelope 40 has a flexible and fluidtight wall 41. The third envelope 40 and its wall 41 form and define a third inner chamber 42. At least one additional port 51 is provided on the wall 41, adapted to be closed or connected in a fluidtight and removable manner.

The third envelope 40 is external to the first and second envelopes 3, 4, the second envelope 4 being placed in the third envelope 40. Thus, the first envelope 3 (and therefore the first inner chamber 6) is placed completely within, in other words inside of, the second envelope 4, or symmetrically the second envelope 4 is placed so as to surround the exterior of the first envelope 3 (and therefore the first inner chamber 6). The second envelope 4 is also placed completely within the third envelope 40.

Externally to the second envelope 4 but within the third envelope 40, an additional intermediate space 43 located outside the second envelope 4 is formed. The bag 1 also comprises a spacer element 44 as defined above, housed in this additional intermediate space 43, interposed between the wall 16 of the second envelope 4 and the wall 41 of the third envelope 40. This spacer element 44 is suitable for preventing a possible hole T from being covered in the wall 16 of the second envelope 4 or in the wall 41 of the third envelope 40.

In addition, spacer element 44 preferably has the same properties as spacer element 23 comprised in intermediate space 22 as described above. In particular, spacer element 44 may comprise one or more porous layers fully covering the outer face 16B of the wall 16 of the second envelope 4 and/or the inner face of the wall 41 of the third envelope 40 (the term "porosity" to be understood as above). Spacer element 44 may be neutral to the biopharmaceutical fluid 2 (the term "neutral" to be understood as above). Spacer element 44 may also be responsive, in other words sensitive, to the presence of the biopharmaceutical fluid 2 that reaches it by changing from a first color to a second color that is different from the first color.

The use of three envelopes 3, 4, 40 in a single bag 1 serves to reinforce the protection of the biopharmaceutical fluid 2. This is all the more true as it is statistically unlikely that all three envelopes 3, 4, 40 have holes T aligned in a manner that allows a contaminant to travel easily from outside to inside the first envelope 3 where the biopharmaceutical fluid 2 is located. The first envelope 3, the second envelope 4, the third envelope 40, and the spacer elements 23, 44 thus form a coherent whole, in particular during use of the bag 1. In particular, the fill tube 12 and the discharge tube 14 traverse the third envelope 40 by sealed connections, the fill inlet 13 and the discharge outlet 15 being located outside the third envelope 40 so as to be accessible.

As in the first embodiment described by FIG. 4, the system 39 comprises a source 45 of pressurized gas, an injection line 46 for injecting the pressurized gas, a control and management member 47, and a gas detection member 48. The gas is intended to be introduced into the intermediate space 22 of the bag 1, in particular into the second envelope 4 via the port 20 and appropriate connecting elements. The gas detection member 48 is able in particular to be associated in fluid communication or is associated in fluid communication with the additional port 51 the third envelope 40 of the bag 1. In particular, one may refer to the more detailed description of the embodiment of FIG. 4 for these elements of the system 39.

The method for making use of the system 39 for verifying the integrity of the bag 1 which has just been described comprises a preparation phase followed by a test phase.

In the preparation phase, a system 39 as described and bag 1 having a third envelope 40 as described are provided. The bag 1, and in particular the first envelope 3, may be filled with biopharmaceutical fluid 2 or empty of biopharmaceutical fluid 2. The fill inlet 13 and the discharge outlet 15 of the first envelope 3 are then in the closed state.

The port 20 of the second envelope 4 is connected to the source 45 of gas, which is made possible due to a fluidtight opening 49 for the passage of the injection line 46, formed in the third envelope 40 of the bag 1. With this connection, it is then possible to send the pressurized gas into the intermediate space 22.

In the test phase, the pressurized gas is sent from the source into the intermediate space 22 of the second envelope 4. Then, in a subsequent step, detection of the presence of gas in the third envelope 40, and in particular in the additional intermediate space 43, is performed by means of the gas detection member 48.

In the same manner as in the first embodiment of FIG. 4, the results of the integrity verification can then be interpreted. If the gas is not detected, the second envelope 4 is considered to have passed the integrity verification. However, if the gas is detected, the second envelope 4 is considered not to have passed the integrity verification.

Figure 7:
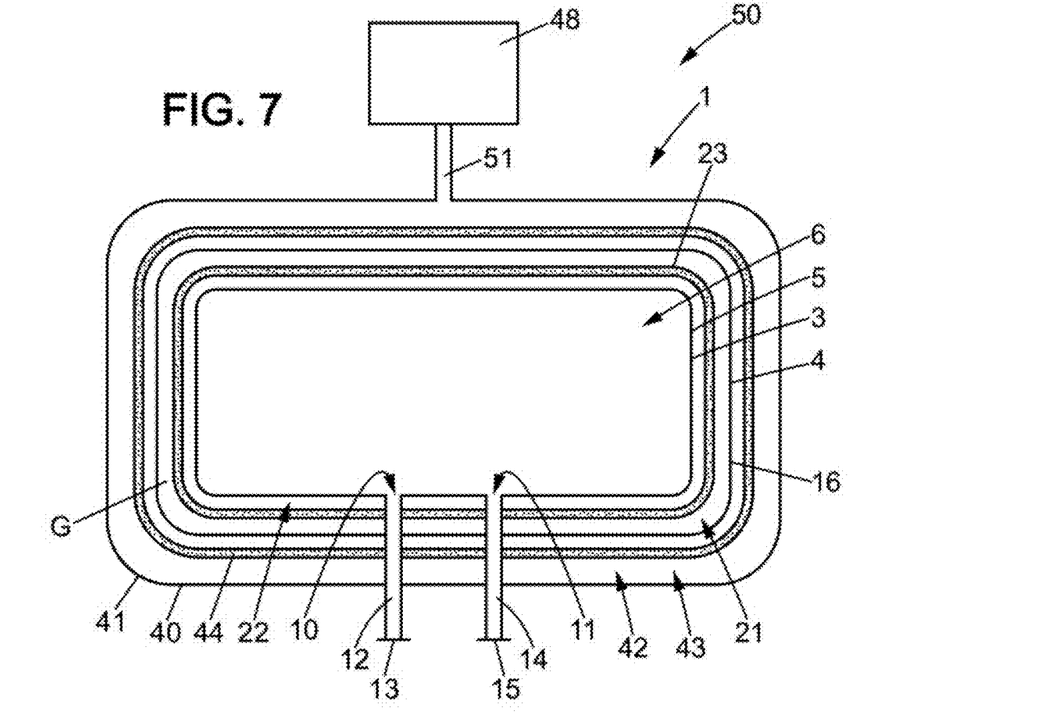
FIG. 7 is a schematic view of a fourth embodiment of a system for verifying the integrity of a bag comprising a third envelope, a tracer gas filling the intermediate space of the bag and a gas detection member being connected to the third envelope.

In a fourth embodiment illustrated in FIG. 7, a system 50 for detecting the integrity of a bag 1 which also comprises a third envelope 40 as described above may be used.

In this embodiment, the intermediate space 22 between the first envelope 3 and the second envelope 4 already comprises a tracer gas G. Such a tracer gas G is selected for example from the group comprising oxygen, nitrogen, carbon dioxide, sulfur hexafluoride (SF6), and helium. In particular, the tracer gas G may be a mixture of nitrogen and carbon dioxide. Generally, the tracer gas G is at a greater pressure than the pressure in the additional intermediate space 43 between the second envelope 4 and the third envelope 40. In this manner, the higher pressure in the intermediate space 22 prevents contaminant from entering the first and second envelopes 3, 4 in the event of holes T, the tracer gas G then necessarily escaping from inside to outside the bag 1.

As in the third embodiment of FIG. 6, the additional port 51 of the third envelope 40 is connected to the gas detection member 48.

In the test phase, detection of the presence of tracer gas G in the third envelope 40, and in particular in the additional intermediate space 43 located outside the second envelope 4, is performed by means of the gas detection member 48. The results of the integrity verification can then be interpreted similarly to what has been described above. If the gas is not detected, the second envelope 4 is considered to have passed the integrity verification. However, if the gas is detected, the second envelope 4 is considered not to have passed the integrity verification.

Contrary to the embodiments described above, it is not necessary in this fourth embodiment for the second envelope 4 itself to have a port 20, in particular for introducing a gas into the intermediate space 22 of the bag 1. The tracer gas G is already contained in the intermediate space 22 of the bag 1. Thus, in case of loss of sterility at the additional port 51 of the third envelope, the biopharmaceutical fluid 2 remains protected by the first envelope 3 and the second envelope 4.

All the embodiments of FIGS. 4-7, presented in a non-limiting manner as illustrations of the invention, allow verifying the integrity of the bag 1 by verifying the fluidtightness of the second envelope 4. However, if the second envelope 4 does not pass an integrity verification, it may be arranged to then verify the integrity of the bag 1 by verifying the fluidtightness of the first envelope 3 and/or the third envelope 40 if applicable. The bag 1 is not intact, and is therefore unsuitable for receiving and protecting a biopharmaceutical fluid 2, only if the first envelope 1 and the third envelope 40 do not themselves pass the integrity verification. In particular, the spacer element 23 prevents the first envelope 3 and the second envelope 4 from coming in contact with one another in a manner that covers a hole T in the first envelope 3.

Figure 8:
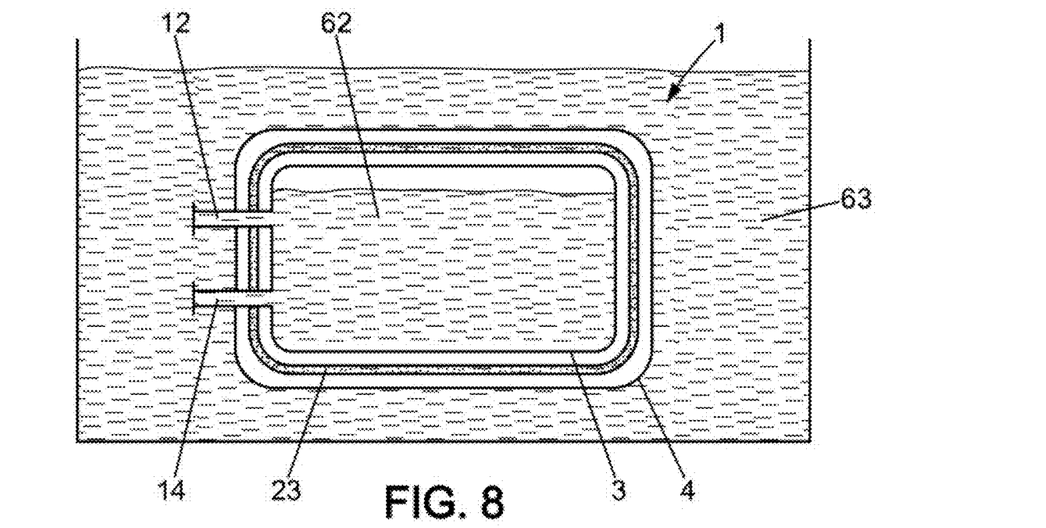
FIG. 8 is a schematic view of a fifth embodiment for verifying the integrity of a bag according to the invention, the first envelope comprising a culture medium and the bag being immersed in a bacteriological medium.

According to a fifth embodiment, the integrity of a bag 1 may be detected according to a bacteriological method.

In this method, firstly the first inner chamber 6 of the first envelope 3 is filled with a culture medium 62 suitable for the growth of bacteria. The culture medium 62 may be for example soybean casein lysate, sometimes called soybean casein digest broth. The bag 1 is then closed, the fill inlet 13 and the discharge outlet 15 of the first envelope 3 then being in the closed state.

A bacteriological medium 63, for example in liquid form, comprising bacteria is then applied to the exterior of the bag 1. Bacteriological medium 63 is understood to mean a medium comprising a particularly high concentration of bacteria, these bacteria being adapted to grow in the culture medium 62 comprised in the bag 1. The bacteriological medium 63 is preferably applied over the entire outer surface of the second envelope 4 or the third envelope 40 where applicable. In particular, the bacteriological medium may be applied to the bag 1 by spraying the bacteriological medium 63 on the bag 1 or by immersing the bag 1 directly in the bacteriological medium 63 as shown in FIG. 8.

The bag 1 is left in contact with the bacteriological medium 63 for a waiting period. In particular, according to the ISO 15747 standard, the bag 1 must be in contact with the bacteriological medium 63 for at least 30 minutes. Then the culture medium 62 is removed from the first chamber 6, partially or entirely, and this culture medium 62 is cultured. Alternatively, the culture medium 62 can be filtered and the filtrate cultured. After an incubation period, it is possible to detect the presence of bacteria in the culture medium 62.

One can then interpret the results of the integrity verification. If no bacteria are detected, the first envelope 3 and/or the second envelope 4 are considered to have passed the integrity verification, while if bacteria are detected, the first envelope 3 and the second envelope 4 are considered not to have passed the integrity verification.

Of course, the invention is not limited to the embodiments described above and provided only as examples. It encompasses the various modifications, alternative forms, and other variants conceivable to a skilled person within the context of the invention, and in particular any combinations of the various modes of operation described above, which may be taken separately or in combination.

In particular, a bag 1 according to the invention may comprise more than three envelopes for containing the biopharmaceutical fluid 2, each additional envelope increasing the integrity of the bag 1 and thus ensuring the absence of any contamination of the biopharmaceutical fluid 2 it contains.

The invention claimed is:

1. A bag for biopharmaceutical fluid, comprising:
   a first envelope which is flexible, closed, fluidtight, and made of plastic, having a wall defining a first inner chamber intended for receiving the biopharmaceutical fluid, the first envelope being provided with at least one fill and/or discharge orifice for filling and/or discharging the biopharmaceutical fluid and at least one fill and/or discharge tube associated in a fluidtight manner with the at least one fill and/or discharge orifice, the at least one fill and/or discharge tube having an inlet for filling and/or discharging the first inner chamber,
   a second envelope which is flexible, closed, fluidtight, and made of plastic, having a wall defining a second inner chamber within which the first envelope is located, the second inner chamber defining an intermediate space between the wall of the first envelope and the wall of the second envelope, and
   a spacer element interposed between the first envelope and the second envelope, in the intermediate space, suitable for preventing a possible hole in the wall of the first envelope or in the wall of the second envelope from being covered,
wherein the first envelope, the second envelope, and the spacer element form a coherent whole, and wherein the at least one fill and/or discharge tube traverses the second envelope by a fluidtight connection, the fill and/or discharge inlet being located outside the second envelope.

2. The bag according to claim 1, wherein the spacer element is porous and completely covers the wall of the first envelope.

3. The bag according to claim 1, wherein the spacer element is porous and comprises an opening to the wall of the first envelope.

4. The bag according to claim 1, wherein the first envelope is of a 2D type or wherein the first envelope is of a 3D type comprising one or more gussets.

5. The bag according to claim 1, wherein the spacer element comprises at least one porous layer of woven fabric, non-woven fabric, PE, PP, or PTFE.

6. The bag according to claim 1, wherein the spacer element is responsive to the biopharmaceutical fluid that reaches it, and wherein the bag further comprises a detection member to detect an interaction between the spacer element and the biopharmaceutical fluid.

7. The bag according to claim 1, wherein the spacer element is neutral to the biopharmaceutical product.

8. The bag according to claim 1, wherein the wall of the second envelope comprises a port suitable for being closed or connected in a fluidtight and removable manner to a source of gas or fluid.

9. The bag according to claim 1, comprising a third envelope which is flexible, closed, fluidtight, and made of plastic, having a wall defining a third inner chamber in which the second envelope is located, the third envelope defining an additional intermediate space between the wall of the second envelope and the wall of the third envelope, the bag further comprising an additional spacer element interposed between the second envelope and the third envelope.

10. The bag according to claim 9, wherein the first envelope, the second envelope, the third envelope, the spacer element and the additional spacer element form a coherent whole during use of the bag,
and wherein the additional spacer element is suitable for preventing a possible third envelope wall hole from being covered by the wall of the second envelope.

11. The bag according to claim 9, wherein the at least one fill and/or discharge tube traverses the third envelope by a fluidtight connection, the fill and/or discharge inlet being located outside the third envelope.

12. The bag according to claim 9, wherein the intermediate space is filled with a tracer gas at a pressure greater than the pressure present in the additional intermediate space and in the first inner chamber.

13. The bag according to claim 12, wherein the tracer gas is selected from the group comprising carbon dioxide, helium, sulfur hexafluoride, nitrogen, or a mixture thereof.

14. A system for verifying the integrity of a bag, comprising:
a bag according to claim 1,
a source of pressurized gas intended to be introduced into the intermediate space of the bag,
a member for measuring the pressure of the gas in the intermediate space in order to compare the pressure drop in the intermediate space once inflated, relative to a predefined pressure drop threshold, and
two fixed expansion-limiting plates, spaced apart from and facing one another, suitable for not obstructing any leak in the wall of the second envelope placed against them.

15. The system according to claim 14, wherein the expansion-limiting plates are respectively covered with linings that are porous to the gas.

16. The system according to claim 15, wherein the linings are of the same material as the spacer element.

17. A method for verifying the integrity of a bag in order to detect the existence of a possible hole, wherein:
in a preparation phase:
the system for verifying integrity according to claim 14 is provided,
the bag is placed between the two expansion-limiting plates,
at least one port of the second envelope is connected to the source of gas and the pressure measurement member, in order to be able to send the pressurized gas into the intermediate space,
in a test phase:
the pressurized gas is sent into the intermediate space, the expansion of the bag being restricted when the wall of the second envelope encounters the expansion-limiting plates,
then, in a subsequent step, the pressure drop in the intermediate space is compared to the predefined threshold by means of the pressure measurement member, such that if the pressure drop in the intermediate space is less than the threshold the second envelope is considered to have passed the integrity verification, whereas if the pressure drop in the intermediate space is greater than the threshold the second envelope is considered not to have passed the integrity verification.

18. A system for monitoring the integrity of a bag, wherein the system comprises a gas detection member and the bag according to claim 1.

19. The system according to claim 18, further comprising:
a source of pressurized gas intended to be introduced into the intermediate space,
a gas pressure control and management member.

20. The system according to claim 19, further comprising an outer container adapted and intended for receiving the bag in its entirety.

21. A method for verifying the integrity of a bag in order to detect the existence of a possible hole, wherein:
in a preparation phase:
a system for verifying integrity according to claim 18 is provided,
in a test phase:
the presence of gas outside the second envelope is detected by means of the gas detection member, such that if the gas is not detected the second envelope is considered to have passed the integrity verification, whereas if the gas is detected the second envelope is considered not to have passed the integrity verification.

22. The method according to claim 21, wherein, in the preparation phase, a system for monitoring the integrity of the bag is provided, the system comprising:
the gas detection member;
a source of pressurized gas intended to be introduced into the intermediate space; and
a gas pressure control and management member;
and wherein at least one port of the second envelope is connected to the source of gas and the gas pressure control and management member, in order to be able to send the pressurized gas into the intermediate space during the test phase prior to performing the detection of the presence of gas outside the second envelope.

23. The method according to claim 21, wherein, in the preparation phase, the bag is provided further comprising a third envelope which is flexible, closed, fluidtight, and made of plastic, having a wall defining a third inner chamber in which the second envelope is located, the third envelope defining an additional intermediate space between the wall of the second envelope and the wall of the third envelope, the bag further comprising an additional spacer element interposed between the second envelope and the third envelope,
and wherein at least one additional port of the third envelope is connected to the gas detection member.

24. The method according to claim 21, wherein, in the preparation phase, a system for monitoring the integrity of the bag is provided, wherein the system comprises:
the bag;
the gas detection member;
a source of pressurized gas intended to be introduced into the intermediate space;
a gas pressure control and management member; and
an outer container adapted and intended for receiving the bag in its entirety;

wherein the gas detection member is connected to a port of the outer container, so as to enable detection of the gas inside the outer container during the test phase.

25. A method for verifying the integrity of a bag in order to detect a possible hole, wherein:

the bag according to claim 1 is provided, wherein the first inner chamber is filled with a culture medium suitable for allowing the growth of bacteria, the bag is closed, a bacteriological medium is applied to the exterior of the bag, the culture medium filling the first chamber is cultured and detection of the presence of bacteria in the culture medium is performed, such that if bacteria are not detected the first envelope and/or the second envelope are considered to have passed the integrity verification, whereas if bacteria are detected the first envelope and the second envelope are considered not to have passed the integrity verification.

26. The method according to claim 25, wherein the bacteriological medium is applied to the bag by spraying the bacteriological medium on the bag or by immersing the bag in the bacteriological medium.

\* \* \* \* \*